(12) United States Patent
Qian et al.

(10) Patent No.: US 11,996,083 B2
(45) Date of Patent: May 28, 2024

(54) GLOBAL PROSODY STYLE TRANSFER WITHOUT TEXT TRANSCRIPTIONS

(71) Applicant: INTERNATIONAL BUSINESS MACHINES CORPORATION, Armonk, NY (US)

(72) Inventors: Kaizhi Qian, Champaign, IL (US); Yang Zhang, Cambridge, MA (US); Shiyu Chang, Elmsford, NY (US); Jinjun Xiong, Goldens Bridge, NY (US); Chuang Gan, Cambridge, MA (US); David Cox, Somerville, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 226 days.

(21) Appl. No.: 17/337,518

(22) Filed: Jun. 3, 2021

(65) Prior Publication Data

US 2022/0392429 A1 Dec. 8, 2022

(51) Int. Cl.
| | | |
|---|---|---|
| *G10L 13/10* | (2013.01) | |
| *G06N 20/00* | (2019.01) | |
| *G10L 17/04* | (2013.01) | |
| *G10L 21/013* | (2013.01) | |
| *G10L 25/63* | (2013.01) | |

(52) U.S. Cl.
CPC .............. *G10L 13/10* (2013.01); *G06N 20/00* (2019.01); *G10L 17/04* (2013.01); *G10L 21/013* (2013.01); *G10L 25/63* (2013.01)

(58) Field of Classification Search
CPC ....... G10L 13/10; G10L 17/04; G10L 21/013; G10L 25/63; G10L 25/30; G10L 21/007; G06N 20/00
See application file for complete search history.

(56) References Cited

U.S. PATENT DOCUMENTS

| | | |
|---|---|---|
| 5,973,252 A | 10/1999 | Hildebrand |
| 7,042,472 B2 | 5/2006 | Sapp |
| 10,453,434 B1 | 10/2019 | Byrd |
| 10,614,826 B2 | 4/2020 | Huffman et al. |

(Continued)

OTHER PUBLICATIONS

Amaratunga, Dhammika, et al. "Resampling-based similarity measures for high-dimensional data." Journal of computational biology 22.1 (2015): pp. 54-62 (Year: 2015).*

(Continued)

*Primary Examiner* — Jesse S Pullias
*Assistant Examiner* — Michael C. Lee
(74) *Attorney, Agent, or Firm* — Tutunjian & Bitetto, P.C.; Stosch Sabo

(57) ABSTRACT

A computer-implemented method is provided of using a machine learning model for disentanglement of prosody in spoken natural language. The method includes encoding, by a computing device, the spoken natural language to produce content code. The method further includes resampling, by the computing device without text transcriptions, the content code to obscure the prosody by applying an unsupervised technique to the machine learning model to generate prosody-obscured content code. The method additionally includes decoding, by the computing device, the prosody-obscured content code to synthesize speech indirectly based upon the content code.

17 Claims, 8 Drawing Sheets

(56) References Cited

U.S. PATENT DOCUMENTS

| | | | |
|---|---|---|---|
| 10,964,300 B2 | 3/2021 | Xiao | |
| 2013/0218568 A1* | 8/2013 | Tamura | G10L 13/033 |
| | | | 704/260 |
| 2018/0018533 A1* | 1/2018 | Taranta, II | G06F 3/04883 |
| 2020/0365166 A1 | 11/2020 | Zhang et al. | |
| 2020/0372897 A1* | 11/2020 | Battenberg | G10L 13/033 |
| 2022/0051654 A1* | 2/2022 | Finkelstein | G06N 3/045 |

OTHER PUBLICATIONS

Zhang, Ya-Jie, et al. "Learning latent representations for style control and transfer in end-to-end speech synthesis." ICASSP 2019—2019 IEEE International Conference on Acoustics, Speech and Signal Processing (ICASSP). IEEE, 2019, pp. 6945-6949 (Year: 2019).*

Polyak, Adam, et al. "Attention-based wavenet autoencoder for universal voice conversion." ICASSP 2019—2019 IEEE International Conference on Acoustics, Speech and Signal Processing (ICASSP). IEEE, 2019, pp. 6800-6804 (Year: 2019).*

Qian, Kaizhi, et al. "Unsupervised Speech Decomposition via Triple Information Bottleneck." arXiv preprint arXiv:2004.11284v3 (May 4, 2020), pp. 1-14 (Year: 2020).*

Bhati, Saurabhchand, et al. "Self-Expressing Autoencoders for Unsupervised Spoken Term Discovery." (2020), pp. 4876-4880 (Year: 2020).*

Lu, Chunhui, et al. "Multi-speaker emotional speech synthesis with fine-grained prosody modeling." ICASSP 2021—2021 IEEE International Conference on Acoustics, Speech and Signal Processing (ICASSP). pp. 5729-5733 (May 21, 2021) (Year: 2021).*

Definition of "Collusion" at Dictionary.com, available at https://web.archive.org/web/20210515015348/https://www.dictionary.com/browse/collusion (archived May 15, 2021) (Year: 2021).*

Wu, Da-Yi, et al. "Speech-to-singing conversion based on boundary equilibrium GAN." arXiv preprint arXiv:2005.13835 (Aug. 5, 2020), pp. 1-5 (Year: 2020).*

Karlapati, Sri, et al. "Copycat: Many-to-many fine-grained prosody transfer for neural text-to-speech." arXiv preprint arXiv: 2004.14617 (Apr. 30, 2020), pp. 1-5 (Year: 2020).*

Su, Zhiba, et al. "The Ximalaya TTS System for Blizzard Challenge 2020." Proc. Joint Workshop for the Blizzard Challenge and Voice Conversion Challenge (Oct. 30, 2020), pp. 59-63 (Year: 2020).*

Morrison, Max, et al. "Context-aware prosody correction for text-based speech editing." IEEE International Conference on Acoustics, Speech and Signal Processing (ICASSP) (May 13, 2021), pp. 7038-7042 (Year: 2021).*

Franke, Joerg, et al. "Phoneme boundary detection using deep bidirectional lstms." Speech Communication; 12. ITG Symposium. VDE, 2016, pp. 377-381 (Year: 2016).*

Ramteke, Pravin Bhaskar, et al. "Phoneme boundary detection from speech: A rule based approach." Speech Communication 107 (2019): pp. 1-17 (Year: 2019).*

Mell et al., "The NIST Definition of Cloud Computing", National Institute of Standards and Technology, Special Publication 800-145, Sep. 2011, pp. 1-7.

Qian, Kaizhi, et al., "Unsupervised Speech Decomposition via Triple Information Bottleneck", InInternational Conference on Machine Learning, PMLR. Nov. 21, 2020, pp. 1-11.

Lindahl, Kristin M., et al., "System for Coding Interactions and Family Functioning (SCIFF): A Coding System for Family Problem Discussions", University of Miami. Jun. 2000, pp. 1-34.

Hsu, Wei-Ning, et al., "Unsupervised Learning of Disentangled and Interpretable Representations from Sequential Data", arXiv preprint arXiv:1709.07902. Sep. 22, 2017, pp. 1-23.

Chou, Ju-Chieh, et al., "Multi-target Voice Conversion without Parallel Data by Adversarially Learning Disentangled Audio Representations", arXiv preprint arXiv:1804.02812. Apr. 9, 2018, pp. 1-6.

Wang, J., Li, J., Zhao, X., Wu, Z., Kang, S., & Meng, H. (Jan. 30, 2021). Adversarially learning disentangled speech representations for robust multi-factor voice conversion. arXiv preprint arXiv:2102.00184.

Zhou, K., Sisman, B., Zhang, M., & Li, H. (May 13, 2020). Converting anyone's emotion: Towards speaker-independent emotional voice conversion, arXiv preprint arXiv:2005.07025.

International Search Report from PCT/EP2022/064101 dated Oct. 4, 2022, 12 pgs.

* cited by examiner

GLOBAL PROSODY STYLE TRANSFER WITHOUT TEXT TRANSCRIPTIONS

BACKGROUND

The present invention generally relates to speech processing, and more particularly to global prosody style transfer without text transcriptions.

Prosody plays an important role in characterizing the style of a speaker or an emotion, but most non-parallel voice or emotion style transfer algorithms do not convert any prosody information. Two major components of prosody are pitch and rhythm. Rhythm summarizes the sequence of phone durations, and expresses phrasing, speech rate, pausing, and some aspects of prominence. Pitch reflects intonation. Disentangling the prosody information, particularly the rhythm component, from the speech is challenging because it involves breaking the synchrony between the input speech and the disentangled speech representation. As a result, most existing prosody style transfer algorithms would need to rely on some form of text transcriptions to identify the content information, which confines the application to high-resource languages only. High resource languages are languages for which many data resources exist, making possible the development of machine-learning based systems for these languages.

Speech style transfer refers to the tasks of transferring the source speech into the style of the target domain, while keeping the content unchanged. For example, in voice style transfer, the domains correspond to the speaker identities. In emotion style transfer, the domains correspond to the emotion categories. In both of these tasks, prosody is supposed to be an important part of the domain style, for example, different speakers or emotions have distinctive prosody patterns. However, few of the state of-the-art algorithms in these two applications can convert the prosody aspect at all, and require transcriptions.

SUMMARY

According to aspects of the present invention, a computer-implemented method is provided of using a machine learning model for disentanglement of prosody in spoken natural language. The method includes encoding, by a computing device, the spoken natural language to produce content code. The method further includes resampling, by the computing device without text transcriptions, the content code to obscure the prosody by applying an unsupervised technique to the machine learning model to generate prosody-obscured content code. The method additionally includes decoding, by the computing device, the prosody-obscured content code to synthesize speech indirectly based upon the content code.

In an embodiment, the content code can be resampled using a similarity-based random resampling technique that shortens, using similarity based down sampling, or lengthens, using similarity based up sampling, content code segments with a similarity above a threshold amount to be of equal length to form the prosody-obscured content code. In an embodiment, the similarity above the threshold can be a prosody similarity threshold.

In an embodiment, the resampling step can be guided by self-expressive representation learning.

In an embodiment, a rhythm component, from among multiple prosody components, can be obscured in the content code by the resampling step to generate the prosody-obscured content code.

In an embodiment, the prosody-obscured content code can be decoded using a target domain label. In an embodiment, the target domain label can be a domain summary specifying at least one speaker identity and at least one emotion category.

In an embodiment, the resampling step can be performed by a two-stage training technique that prevents an encoder performing the encoding step from colluding with a decoder performing the decoder step to collectively encode and decode rhythm information. In an embodiment, the two stage training technique can include a synchronous training portion that uses a sample length aligner to align sample lengths and restore input prosody and an asynchronous training portion lacking the sample length aligner to enable a decoder to infer prosody According to other aspects of the present invention, a computer program product is provided for using a machine learning model for disentanglement of prosody in spoken natural language. The computer program product includes a computer readable storage medium having program instructions embodied therewith. The program instructions are executable by a computer to cause the computer to encode, by an encoder of the computer, the spoken natural language to produce content code. The program instructions are executable by the computer to cause the computer to resample, by a resampler of the computer without text transcriptions, the content code to obscure the prosody by applying an unsupervised technique to the machine learning model to generate prosody-obscured content code. The program instructions are executable by the computer to cause the computer to decode, by a decoder of the computer, the prosody-obscured content code to synthesize speech indirectly based upon the content code.

According to yet other aspects of the present invention, a global prosody transfer system is provided. The system includes a memory device for storing program code. The system further includes a processor device operatively coupled to the memory device for running the program code to encode the spoken natural language to produce content code. The processor device further runs the program code to resample, without text transcriptions, the content code to obscure the prosody by applying an unsupervised technique to the machine learning model to generate prosody-obscured content code. The processor device also runs the program code to decode the prosody-obscured content code to synthesize speech indirectly based upon the content code.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to global prosody style transfer without text transcriptions. Embodiments of the present invention can disentangle global prosody style from speech without relying on text transcriptions.

Embodiments of the present invention can involve an Autoencoder-based Prosody Style Transfer framework with a thorough rhythm removal module guided by self-expressive representation learning. Embodiments of the present invention adopt a two-stage training strategy to guarantee passing full content information without leaking rhythm.

Embodiments of the present invention transfer prosody style globally. In global style transfer, the decoder only receives high-level summaries of the target prosody, e.g., speaker identity, emotion, etc. The details of the prosody are inferred by the decoder for such speaker and/or emotion. For example, the decoder decides which word to accelerate, decelerate, rise tone, or drop tone, etc. In local prosody transfer, the decoder is provided with the details of the target prosody, and the decoder exactly follows the details of the provided prosody. It is difficult to obtain the target prosody without a parallel dataset (i.e., a speech utterance with the same content as the input but with different prosody) or text annotations. The present invention overcomes these deficiencies of local prosody transfer.

Embodiments of the present invention can also transfer timbre style globally in a similar manner as prosody as described in further detail herein.

Embodiments of the present invention provide an unsupervised speech decomposition algorithm that (1) does not require text annotations, and (2) can effectively convert prosody style given domain summaries (e.g. speaker identities and emotion categories) that only provide high-level global information.

Embodiments of the present invention can be used to perform prosody style transfer using a cloud based service or cloud computing system as described herein.

Embodiments of the present invention can be for many different types of speech applications. Some exemplary speech applications include, but are not limited to, reducing interference in speech analysis tasks, voice conversion, prosody modification, emotion speech synthesis, and low bit-rate speech encoding (low bit-rate in that the prosody information has been obscured).

Figure 1:
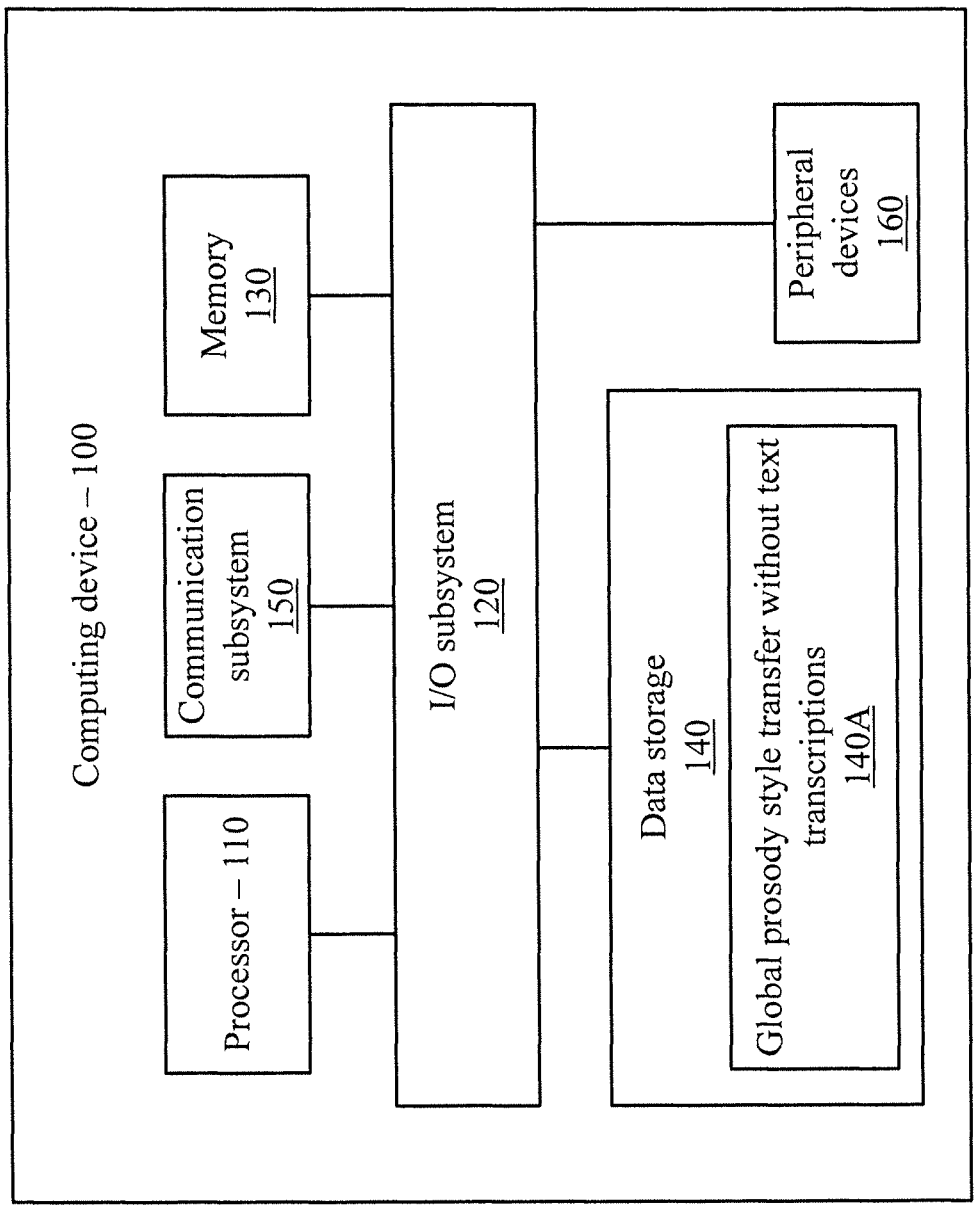
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform global prosody style transfer without text transcriptions.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for global prosody style transfer without text transcriptions. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 6-7s). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention FIGS. 2 and 3 below describe first 200 and second stages 300 of a two-stage training system for global prosody style transfer without text transcriptions.

The first stage 200 corresponds to a synchronous training portion of the two-stage training system, and the second stage 300 corresponds to an asynchronous training portion of the two-stage training system. The synchronous training portion is used to realign $\tilde{Z}(m)$ with $Z(m)$. Realigning $\tilde{Z}(m)$ with $Z(m)$ makes $(Z'(m))$ synchronous with the $Z(m)$. Realignment offsets the effect of the random resampling. Therefore, the first stage 200 is called synchronous training. Realignment is a key operation in the $1^{st}$ stage. The asynchronous training portion is used to only update the decoder.

Figure 2:
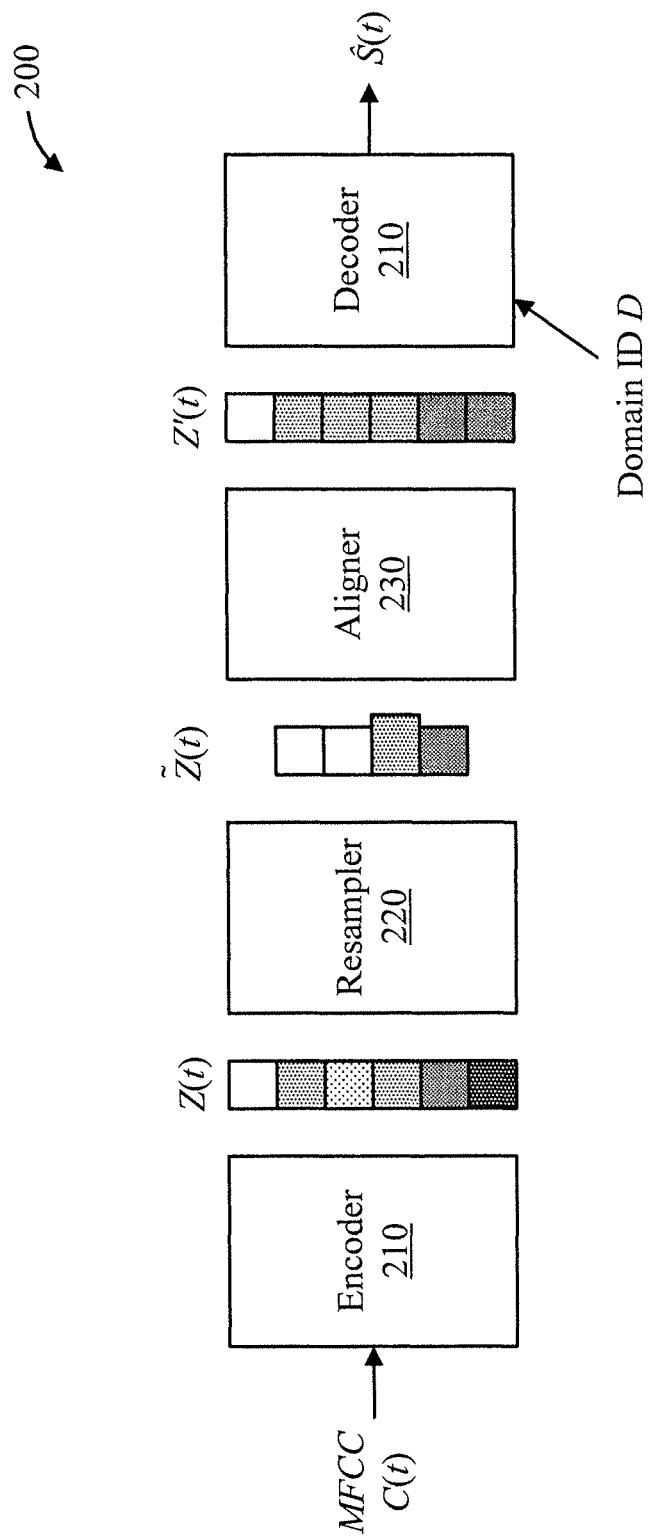
FIG. 2 is a block diagram showing an exemplary first stage of a two-stage training system for global prosody style transfer without text transcriptions, in accordance with an embodiment of the present invention.

FIG. 2 is a block diagram showing an exemplary first stage 200 of a two-stage training system for global prosody style transfer without text transcriptions, in accordance with an embodiment of the present invention.

The first stage 200 includes an encoder 210, a re-sampler 220, an aligner 230, and a decoder 240.

The encoder 210 receives an input of Mel-Frequency Cepstrum Coefficients (MFCCs) $C(t)$ at time t and encodes $C(t)$ to output an encoded representation $Z(t)$. It is to be noted that the constituent elements of the encoded representation $Z(t)$ are aligned lengthwise after encoding.

The re-sampler 220 receives the encoded representation $Z(t)$ and re-samples the encoded representation $Z(t)$ to output a resampled representation $\tilde{Z}(t)$. It is to be noted that the constituent elements of the resampled representation $\tilde{Z}(t)$ are not aligned lengthwise after resampling.

The aligner 230 receives the resampled representation $\tilde{Z}(t)$ and aligns the lengths of its constituent elements to output an aligned representation $\acute{Z}'(t)$.

The decoder 240 receives the aligned representation $Z'(t)$ and decodes the aligned representation $Z'(t)$ responsive to domain ID D to output synthesized speech $\hat{S}(t)$.

Figure 3:
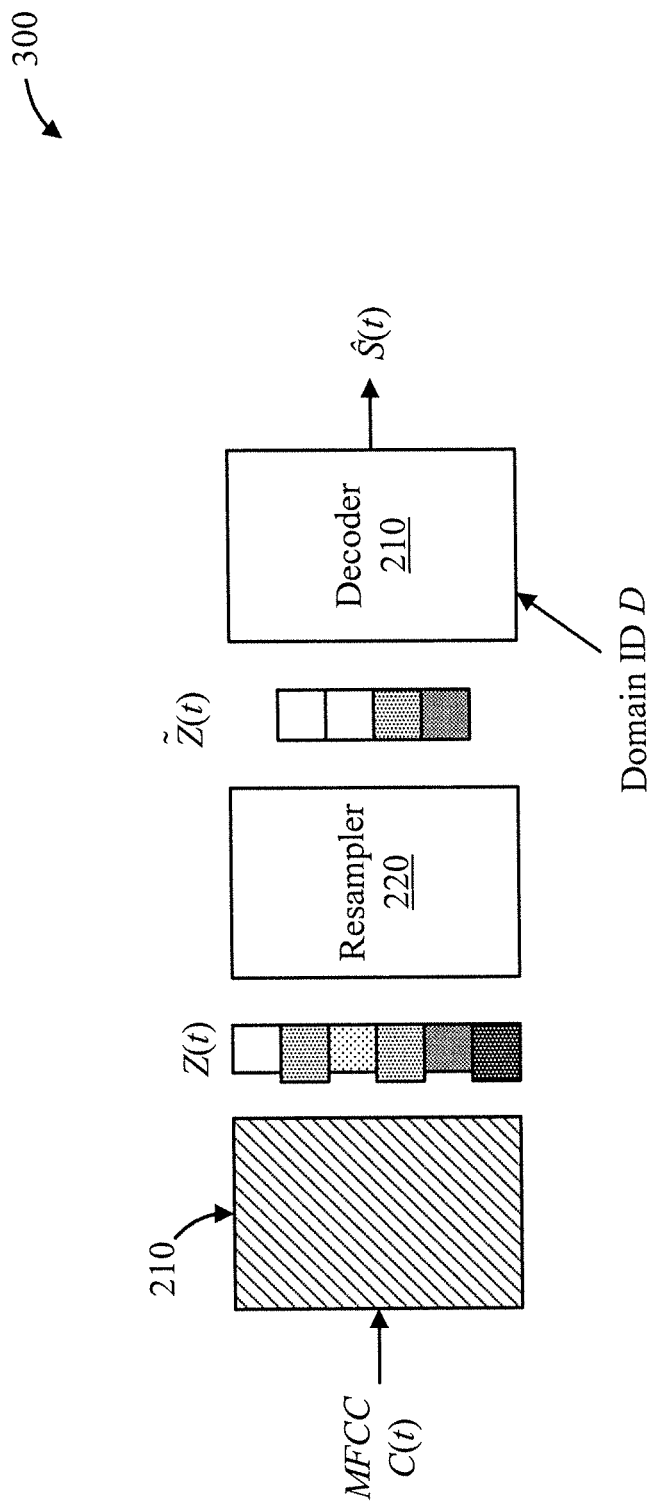
FIG. 3 is a block diagram showing an exemplary second stage of a two-stage training system for global prosody style transfer without text transcriptions, in accordance with an embodiment of the present invention.

FIG. 3 is a block diagram showing an exemplary second stage 300 of a two-stage training system for global prosody style transfer without text transcriptions, in accordance with an embodiment of the present invention.

The first stage 200 includes the encoder 210, the re-sampler 220, and the decoder 240 of the first stage.

The encoder 210, whose parameters are frozen in the second stage 300, receives an input of Mel-Frequency Cepstrum Coefficients (MFCCs) $C(t)$ at time t and encodes $C(t)$ to output an encoded representation $Z(t)$. It is to be noted that the constituent elements of the encoded representation $Z(t)$ are not aligned lengthwise after encoding. The $Z(t)$ after encoding is still aligned with the input. Only resampling changes the alignment. The main difference between FIG. 2 and FIG. 3 is that FIG. 3 does not have the aligner 230. In FIG. 2, aligner 230 restores the input prosody so that the decoder 240 does not need to focus on reconstructing the prosody for now. In FIG. 3, without the aligner 230, the decoder 240 has to learn how to infer the prosody from the resampled content code and the domain ID. This stage 300 is where the decoder 240 really learns to infer prosody. The first stage 200 prepares the decoder 240 by learning how to reconstruct the non-prosody components.

The re-sampler 220 receives the encoded representation $Z(t)$ and re-samples the encoded representation to output a resampled representation $\tilde{Z}(t)$. It is to be noted that the constituent elements of the resampled representation $\tilde{Z}(t)$ are not aligned lengthwise after resampling as resampling changes the length.

The decoder 240 receives the resampled representation $\tilde{Z}(t)$ and decodes the resampled representation $\tilde{Z}(t)$ responsive to domain ID D to output synthesized speech $\hat{S}(t)$.

Figure 4:
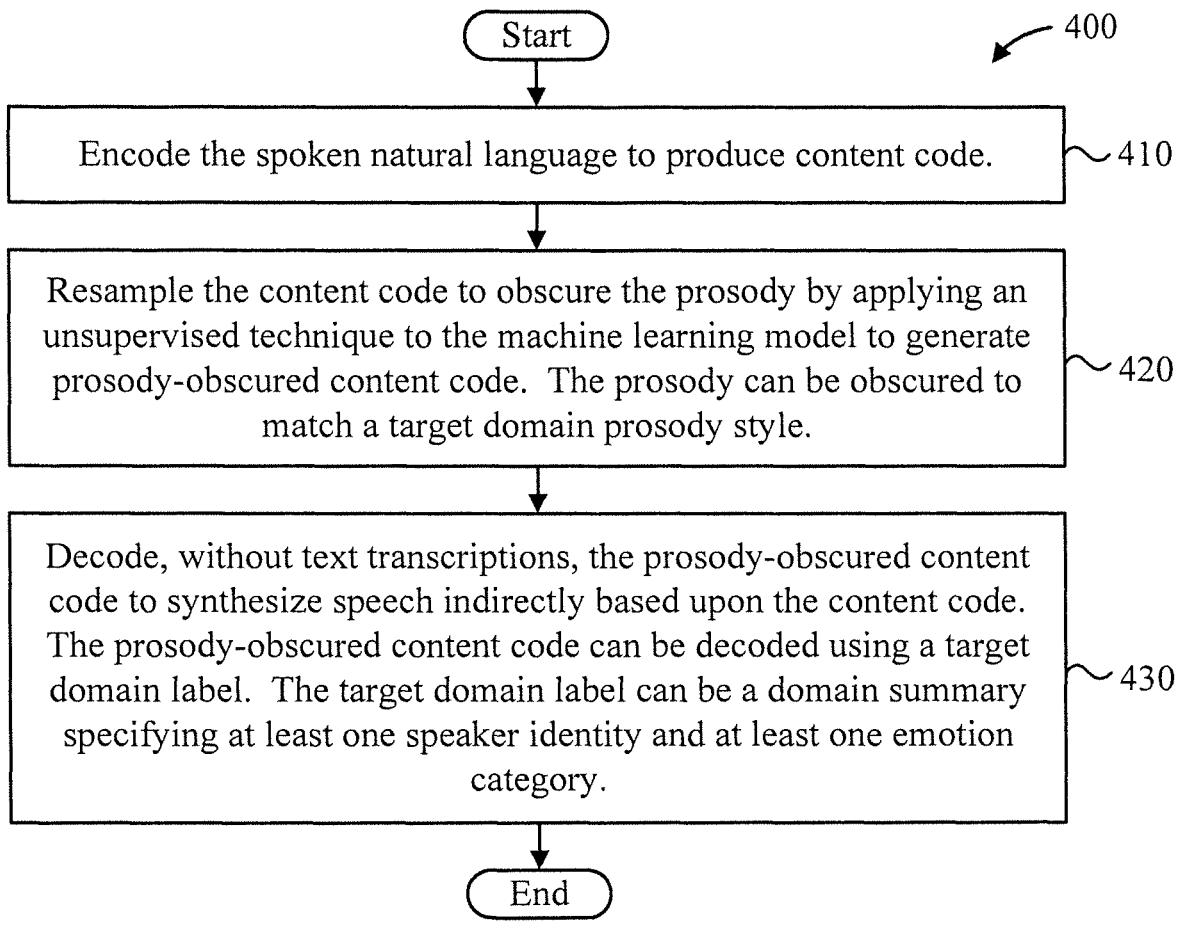
FIG. 4 is a flow diagram showing an exemplary method for global prosody style transfer without text transcriptions, in accordance with an embodiment of the present invention.

FIG. 4 is a flow diagram showing an exemplary method 400 for global prosody style transfer without text transcriptions, in accordance with an embodiment of the present invention.

At block 410, encode the spoken natural language to produce content code.

At block 420, resample the content code to obscure the prosody by applying an unsupervised technique to the machine learning model to generate prosody-obscured content code. It is noted that the use of an unsupervised manner results in a lack of text transcriptions.

At block 430, decode, without text transcriptions, the prosody-obscured content code to synthesize speech indirectly based upon the content code. In an embodiment, the prosody-obscured content code can be decoded using a target domain label. In an embodiment, the target domain label can be a domain summary specifying at least one speaker identity and at least one emotion category.

The reconstruction process is as follows:

$$Z(t)=Enc(C(t)), \tilde{Z}(t)=Res(Z(t)),$$

$$\hat{X}(t)=Dec(\tilde{Z}(t),D) \leftrightarrow X(t). \quad (1)$$

where Enc denotes an encoder, Res denotes a resampler, and Dec denotes a decoder, respectively.

Figure 5:
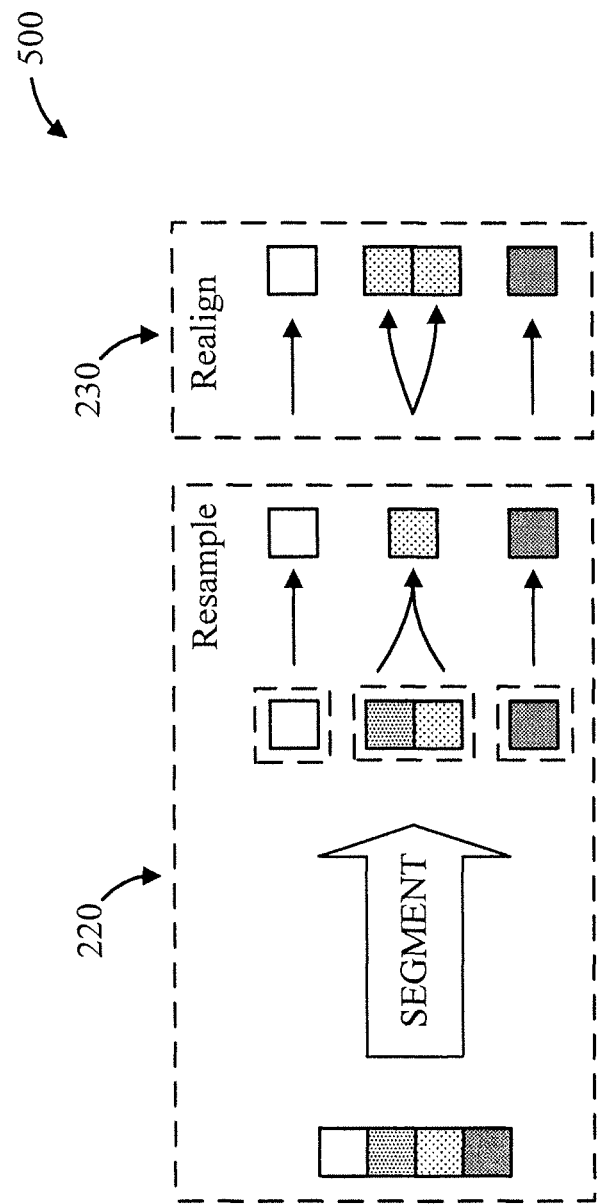
FIG. 5 is a block diagram showing an exemplary down sampling case, in accordance with an embodiment of the present invention.
Figure 6:
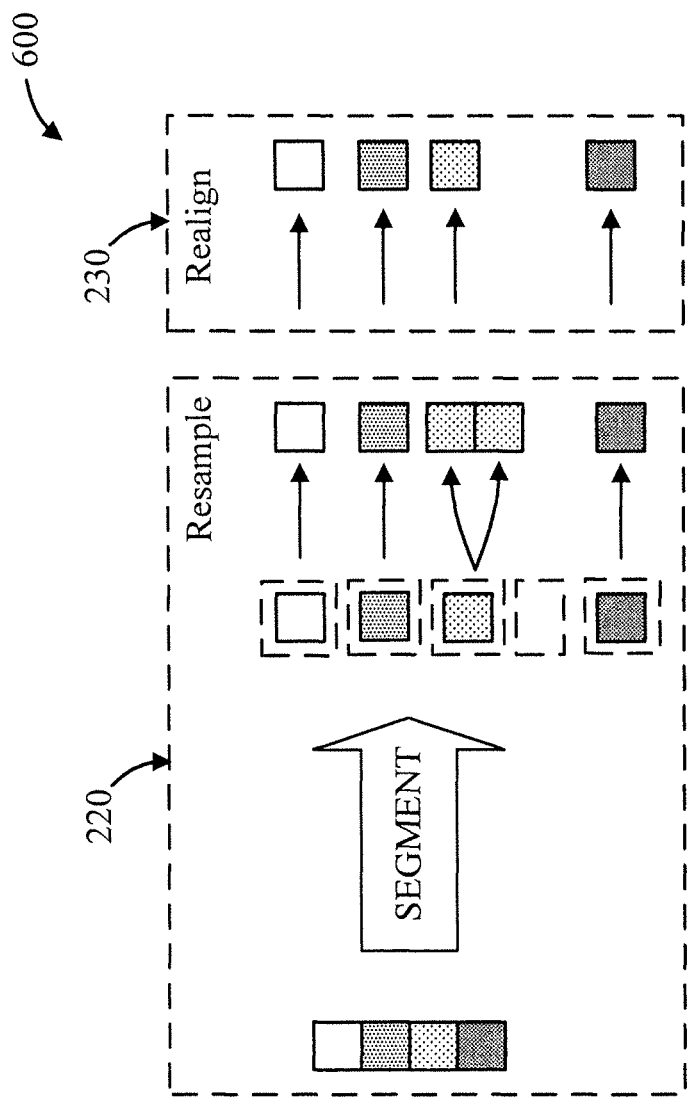
FIG. 6 is a block diagram showing an exemplary up sampling case, in accordance with an embodiment of the present invention.

FIG. 5 is a block diagram showing an exemplary down sampling case 500, in accordance with an embodiment of the present invention. FIG. 6 is a block diagram showing an exemplary up sampling case 600, in accordance with an embodiment of the present invention.

The resampler 220 (left) and aligner 230 (right) are shown in FIGS. 5 and 6. Merging arrows in FIGS. 5 and 6 denote mean-pooling. Splitting arrows in FIGS. 5 and 6 denote copying the input into multiple replicates. The hatching of each block describes the similarity among the representations. Regarding FIG. 5, when $\tau \leq 1$, the sequence is segmented based on similarity, and each segment is merged to one code by mean pooling. Regarding FIG. 6, when $\tau > 1$, each segment contains only one code. In addition, empty segments are inserted where the inter-temporal similarity is high, whose corresponding output positions replicate the previous codes.

Similarity-Based Down Sampling

The resampling scheme of the present invention capitalizes on the observation that the relatively steady segments in speech tend to have more flexible durations.

The present invention thus modifies the self-expressive autoencoder (SEA) algorithm into a similarity based down sampling scheme. SEA derives a frame-level speech representation, which is denoted as A(t), that contrastively promotes a high cosine similarity between frames that are similar, and a low cosine similarity between dissimilar frames. The present invention then creates a Gram matrix, G to record the cosine similarities between any frame pairs:

$$G(t, t') = \frac{A^T(t)A(t')}{\|A(t)\|_2 \|A(t')\|_2} \quad (2)$$

As shown in the left panel of FIG. 5, the down sampling scheme for Z(t) involves two steps. First, the present invention breaks Z(t) into consecutive segments, such that the cosine similarity of A(t) are high within each segment, and that the cosine similarity drop across the segment boundaries. Second, each segment is merged into one code by mean-pooling. Formally, denote the $t_m$ as the left boundary for the m-th segment. Boundaries are sequentially determined. When all the boundaries up to $t_m$ are determined, the next boundary $t_m+1$ is set to t if t is the smallest time in $(t_m,\infty)$ where the cosine similarity between t and $t_m$ drops below a threshold:

$$\forall t' \in [t:t+1], G(t_m,t')) \leq \tau(t). \quad (3)$$

$\tau(t)$ is a pre-defined threshold that can vary across t. After all the segments are determined, each segment is reduced to one code by mean pooling, i.e., $$\tilde{Z}(m)=meanpool(Z(t_m:t_{m+1}-1)). \quad (4)$$

FIG. 6 shows a toy example, where the input sequence of length four. The second and the third codes are very similar. Then with a proper choice of $\tau(t)$, the downsampling would divide the input sequence into three segments, and collapse each segment into one code by mean-pooling. Note that the threshold $\tau(t)$ governs how tolerant the algorithm is to dissimilarities. If $\tau(t)=1$, each code will be assigned to an individual segment, leading to no length reduction.

A segmentation result of two utterances shows that despite their significant difference in length, the two utterances can be broken into approximately equal number of segments and the segments have a high correspondence in terms of content. Since the down sampled output is obtained by mean-pooling each segment, it can be expected that their down sampled output would be very similar and temporally-aligned, which implies that the necessary condition for rhythm information loss is approximately satisfied.

Randomized Thresholding

For any fixed threshold $\tau$ in Equation (3), there is a tradeoff between rhythm disentanglement and content loss. The lower the $\tau$, the more rhythm information is removed, but the more content is lost as well. Ideally, during testing, it is desired to set the threshold to 1 to pass full content information to $\tilde{Z}(t)$, and make the decoder ignore all the rhythm information in $\tilde{Z}(t)$. This can be achieved with a randomized thresholding rule.

To see why, notice that if the decoder were to use the rhythm information in $\tilde{Z}(t)$, it must know the value of $\tau$, because how the decoder recovers the rhythm information depends on how the rhythm information is collapsed, which is governed by $\tau$. However, the large variations in speech rate, utterance length and rhythm patterns in the training speech would overshadow the variations in $\tau$, making it extremely hard to estimate the value of $\tau$. Thus, the decoder will ignore whatever rhythm information remains in $\tilde{Z}(t)$. The present invention adopts a double-randomized thresholding scheme. The present invention first randomly draws a global variable $G \sim U[u_l,u_r]$ that is shared across the entire utterance, where $U[u_l,u_r]$ denotes the uniform distribution within the interval $[u_l,u_r]$. Then to determine if time t should be the next segment boundary (i.e., $t_m+1$ in Equation (3)), the present invention draws a local variable $L(t) \sim U[G-0.05, G+0.05]$. Then $$\tau(t)=L(t)-quantile[G(t_m,t_m-b:t_m+b)]. \quad (5)$$

q—quantile[·] denotes taking the q-quantile.

The motivation for setting the two levels of randomization is that G can obscure the global speech rate information and L(t) can obscure the local fine-grained rhythm patterns.

Similarity-Based Up Sampling

To further obscure the rhythm information, the present invention generalizes the resampling module to accommodate up sampling. Just as down sampling aims to mostly shorten segments with higher similarity (hence, decreasing the disproportionality), up sampling aims to mostly lengthen segments with higher similarity (hence, increasing the disproportionality).

In the down sampling case, $\tau=1$ implies no length reduction at all. It is thus sought to extrapolate the case to $\tau>1$, where the higher the $\tau$, the more the sequence gets lengthened. The up sampling algorithm according to the present invention achieves this by inserting new codes in between adjacent codes. Specifically, suppose all the boundaries up to $t_m$ are determined. When $\tau(t)>1$, according to Equation (3), $t_m+1$ will definitely be set to t. In addition to this, the present invention will add yet another sentence boundary to t, i.e., $t_m+2=t$, if $$\forall t' \in [t:t+1], G(t_m,t')) \geq 1-\tau(t). \quad (6)$$

In other words, the present invention is inserting an empty segment for the (m+1)-th segment (because $t_m+1=t_m+2$). During the mean-pooling stage, this empty segment will be mapped to the code at its left boundary, i.e., $$\tilde{Z}(m)=Z(t_m), \text{ if } t_m=t_{m+1}. \quad (7)$$

The non-empty segments will still be mean-pooled the same way as in Equation (4).

The left panel of FIG. 6 illustrates the up sampling process with the length-four toy example. Similar to the case of $\tau=1$, all the codes are individually segmented. The difference is that a new empty segment is inserted after the third code, which is where the cosine similarity is very high. At the mean-pooling stage, this empty segment turns into an additional code that copies the previous code.

Two-Stage Training

Despite the resampling module, it is still possible for the encoder and decoder to find alternative ways to communicate the rhythm information that is robust against temporal resampling. Thus, the present invention introduces a two-stage training scheme to prevent any possible collusion.

The first stage of training, called the synchronous training, realigns $\tilde{Z}(m)$ with $Z(m)$, as shown in the right panels of FIGS. 5 and 6. Specifically, for the down sampling case, the present invention copies each $\tilde{Z}(m)$ to match the length of the original segment from which the code is mean-pooled; for the up sampling case, the present invention deletes the newly inserted $\tilde{Z}(m)$. The network is then trained end-to-end to reconstruct the input with the realignment module, as shown in FIG. 2. Since the decoder has full access to the rhythm information, the encoder will be trained to pass the content information and not the rhythm information. The second stage, called asynchronous training, removes the realignment module, freezes the encoder, and only updates the decoder, as shown in FIG. 3.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
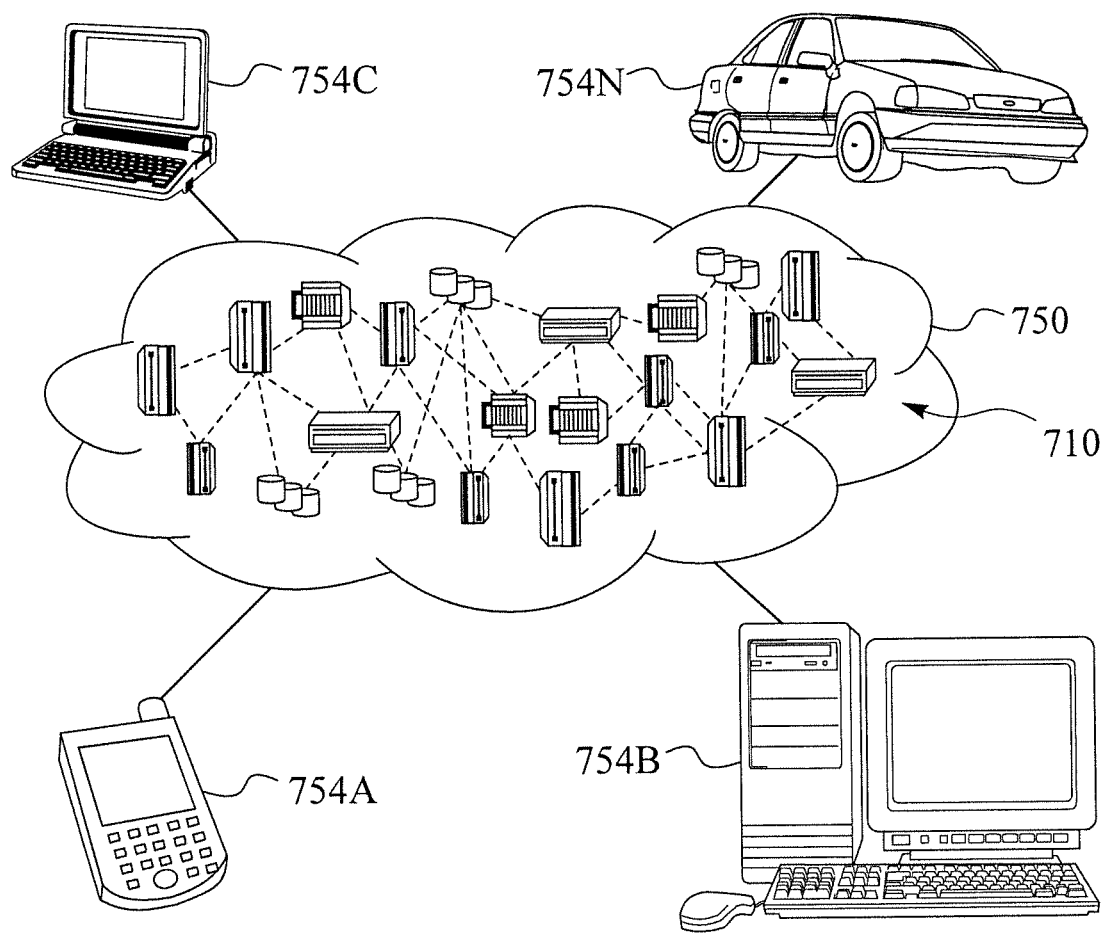
FIG. 7 is a block diagram showing an illustrative cloud computing environment having one or more cloud computing nodes with which local computing devices used by cloud consumers communicate, in accordance with an embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
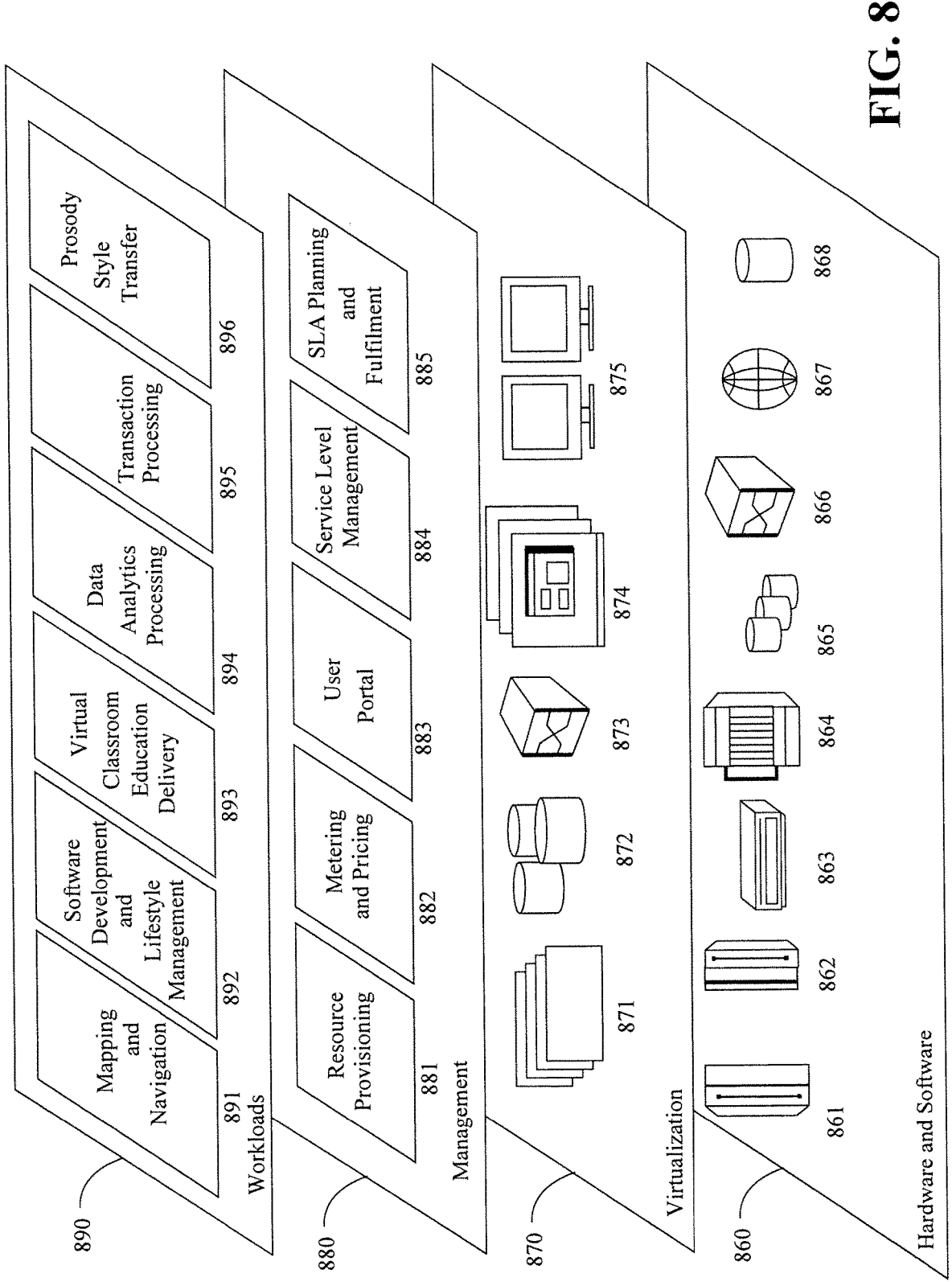
FIG. 8 is a block diagram showing a set of functional abstraction layers provided by a cloud computing environment, in accordance with an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and global prosody style transfer without text transcriptions 896.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method of using a machine learning model for disentanglement of prosody in spoken natural language, the method comprising:
  encoding, by a computing device, the spoken natural language to produce content code;
  resampling, by the computing device without text transcriptions, the content code to obscure the prosody by applying an unsupervised technique to the machine learning model to generate prosody-obscured content code, the content code being resampled using a similarity-based random resampling technique configured for shortening, using similarity based down sampling, or lengthening, using similarity based up sampling, for resampling content code segments with a similarity above a prosody similarly threshold to shorten or lengthen, respectively, such that the content code segments are of equal length to each other to form the prosody-obscured content code; and decoding, by the computing device, the prosody-obscured content code to synthesize speech indirectly based upon the content code.

2. The computer-implemented method of claim 1, wherein prosody conveys rhythm and pitch in the spoken natural language.

3. The computer-implemented method of claim 1, wherein said encoding is performed by an encoder of the computing device, the resampling is performed by a re-sampler of the computing device, and the decoding is performed by a decoder of the computing device.

4. The computer-implemented method of claim 1, wherein said resampling is guided by self-expressive representation learning.

5. The computer-implemented method of claim 1, wherein a rhythm component, from among multiple prosody components, is obscured in the content code by the resampling to generate the prosody-obscured content code.

6. The computer-implemented method of claim 1, wherein the prosody-obscured content code is decoded using a target domain label.

7. The computer-implemented method of claim 6, wherein the target domain label is a domain summary specifying at least one speaker identity and at least one emotion category.

8. The computer-implemented method of claim 1, wherein the method is configured as a cloud-based service having an encoding component, a resampling component, and a decoding component.

9. The computer-implemented method of claim 1, wherein the resampling is performed by a two-stage training technique that prevents an encoder performing the encoding from colluding with a decoder performing the decoding to collectively encode and decode rhythm information.

10. The computer-implemented method of claim 9, wherein the two-stage training technique comprises a synchronous training portion that uses a sample length aligner to align sample lengths to match a length of input prosody, and an asynchronous training portion lacking the sample length aligner to enable a decoder to infer prosody.

11. A computer program product for using a machine learning model for disentanglement of prosody in spoken natural language, the computer program product comprising a computer readable storage medium having program instructions embodied therewith, the program instructions executable by a computer to cause the computer to:

encode, by an encoder of the computer, the spoken natural language to produce content code;

resample, by a resampler of the computer without text transcriptions, the content code to obscure the prosody by applying an unsupervised technique to the machine learning model to generate prosody-obscured content code, the content code being resampled using a similarity-based random resampling technique configured for shortening, using similarity based down sampling, or lengthening, using similarity based up sampling, for resampling content code segments with a similarity above a prosody similarly threshold to shorten or lengthen, respectively, such that the content code segments are of equal length to each other to form the prosody-obscured content code; and decode, by a decoder of the computer, the prosody-obscured content code to synthesize speech indirectly based upon the content code.

12. The computer program product of claim 11, wherein said resampling is guided by self-expressive representation learning.

13. The computer program product of claim 11, wherein the prosody-obscured content code is decoded using a target domain label.

14. The computer program product of claim 13, wherein the target domain label is a domain summary specifying at least one speaker identity and at least one emotion category.

15. The computer program product of claim 11, wherein the resampling is performed by a two-stage training technique that prevents an encoder performing the encoding from colluding with a decoder performing the decoding to collectively encode and decode rhythm information.

16. The computer program product of claim 15, wherein the two-stage training technique comprises a synchronous training portion that uses a sample length aligner to align sample lengths to match a length of input prosody, and an asynchronous training portion lacking the sample length aligner to enable a decoder to infer prosody.

17. A global prosody transfer system, comprising:

a memory device for storing program code; and a processor device operatively coupled to the memory device for running the program code to:

encode spoken natural language to produce content code;

resample, without text transcriptions, the content code to obscure the prosody by applying an unsupervised technique to a machine learning model to generate prosody-obscured content code, the content code being resampled using a similarity-based random resampling technique configured for shortening, using similarity based down sampling, or lengthening, using similarity based up sampling, for resampling content code segments with a similarity above a prosody similarly threshold to shorten or lengthen, respectively, such that the content code segments are of equal length to each other to form the prosody-obscured content code; and decode the prosody-obscured content code to synthesize speech indirectly based upon the content code.

* * * * *